Nov. 25, 1941.   J. MUNRO   2,263,886
MOWER
Filed Jan. 18, 1940   2 Sheets-Sheet 1

INVENTOR
J. Munro
BY E. F. Wenderoth
ATTORNEY

Nov. 25, 1941.  J. MUNRO  2,263,886
MOWER
Filed Jan. 18, 1940   2 Sheets-Sheet 2
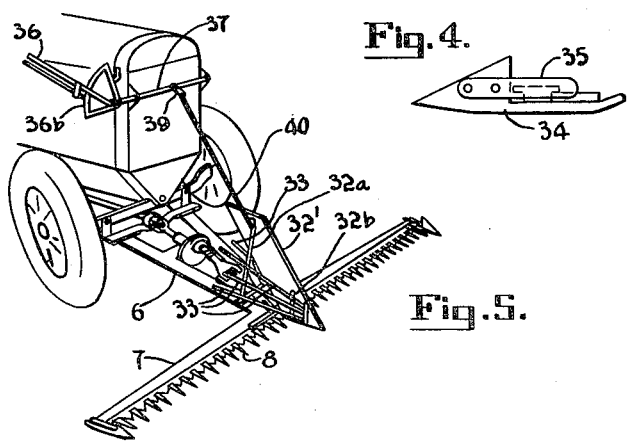
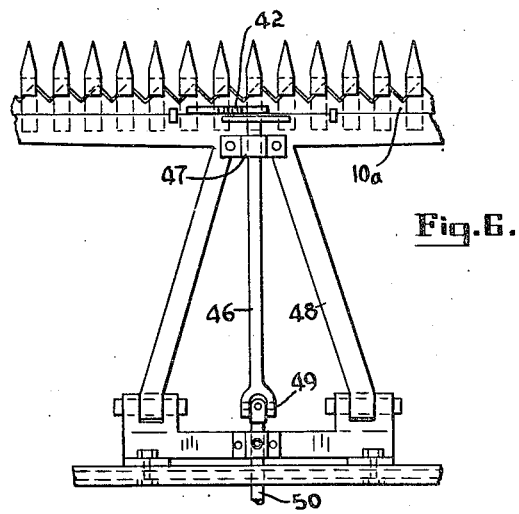
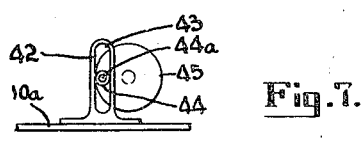
INVENTOR
J. MUNRO
By
E. F. Wendroth
ATTORNEY Patented Nov. 25, 1941

2,263,886

UNITED STATES PATENT OFFICE 2,263,886

MOWER

James Munro, Lochiel, Southland, New Zealand, assignor to Munro Implements Limited, Christchurch, New Zealand Application January 18, 1940, Serial No. 314,553
In New Zealand February 22, 1939

9 Claims. (Cl. 56—25)

This invention has for its object the provision of an improved mower of the reciprocating type which is operated by a motor vehicle such as a tractor.

In the horse-drawn or tractor driven mowers or reapers in general use, the finger bar or board is suspended, and the knives are driven, from one end, and the mower projects outwardly from one side of the farm tractor or vehicle to which it is mounted, with the result that great leverage and strain is brought to bear on the suspending and driving gear. On account of the great strain at the point of suspension the width of cut is generally limited to 4 or 5 feet, the strain increasing rapidly with any increase in the width of cut. Also the driver has to look alternately ahead and to the side all the time.

This invention aims firstly to reduce the strain on the carrying and driving gear and secondly to permit the driver to watch straight ahead so that he can see where he is driving and the progress of cutting, and so that he can see any obstructions such as wire or stumps which may damage the mower and also to enable him to ensure that the knives are running clear all the time.

The invention may be said to consist in a mower of the type described, having means for reciprocating the knife-bar from the centre, in combination with means for mounting the mower frame in operative position transversely across the front of a motor vehicle or tractor and means for driving the knife-bar reciprocating means from the motor of such vehicle or tractor.

This invention also makes it possible to cut a greater width. As the finger bar is suspended from the centre it is balanced and the leverage on the suspending means is counter-balanced, thus making it easy to cut a width of 10 to 12 feet.

Figure 1:
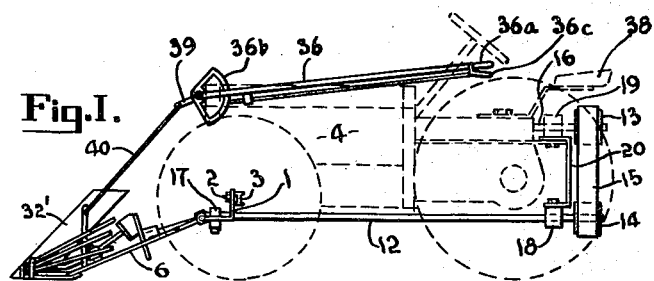
Figure 2:
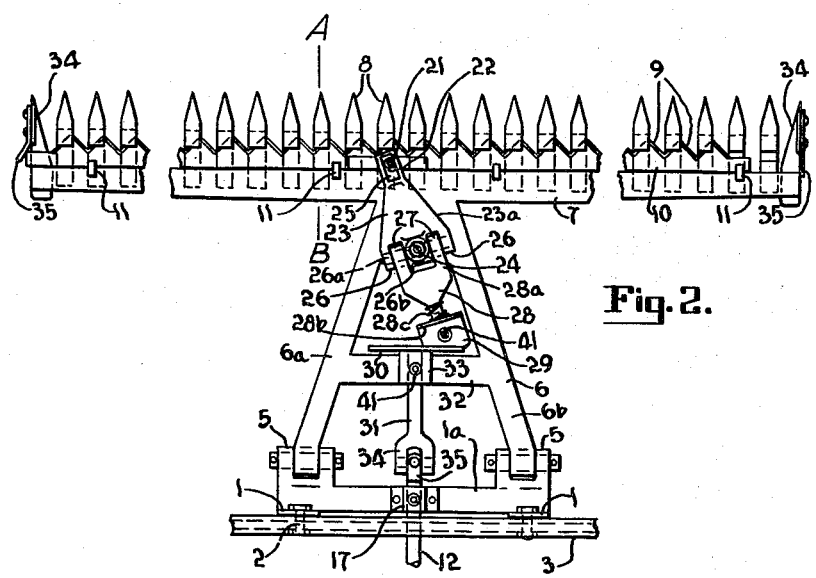
Figure 3:
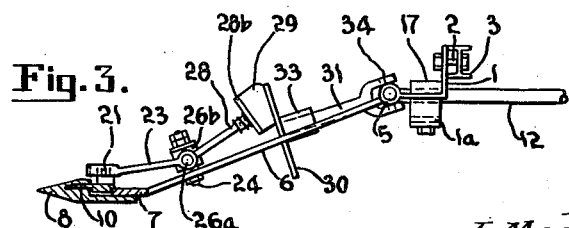

The invention will now, however, be described with reference to the accompanying drawings, in which, Figure 1 is a diagrammatic side elevation of a mower constructed according to the present invention, showing the driving, carrying and lifting gear, and the tractor being shown by dotted lines, Figure 2 is a part-plan of the mower, with the shedder removed, Figure 3 is a side elevation of the mower with the shedder removed, the finger bar and knifebar being cut through on the line A—B, Figure 2, Figure 4 is a side elevation of one form of end-skid, showing a spring employed for the purpose of cushioning the movement of the knifebar and assisting its return, Figure 5 is a perspective view of a mower constructed according to the present invention, attached to the front of a tractor, showing the centre shedder, Figure 6 is a part-plan of another form of mower constructed according to the present invention, and Figure 7 is a diagrammatic front elevation of the middle portion of the knife-bar of the mower shown in Figure 6, showing how it is reciprocated.

In the construction shown in Figures 1 to 5, a pushing frame is employed consisting of two spaced carrying brackets 1 secured by bolts 2 to the front axle 3 of the tractor 4 from which they project forwardly and downwardly, such brackets being connected by a strap 1a and having hinges 5 formed at their lower ends to which the mower frame 6 is hinged.

The mower frame 6, which extends rearwardly from the knife-bar and is hinged to supporting means attached to the vehicle consists of two strong stays 6a and 6b which have their rear ends spaced comparatively widely apart, such stays having at the said rear ends the hinges 5 before referred to, by which they are articulated, the forward ends of such stays 6a and 6b (which converge relatively towards the front of the assembly) being rigidly secured such as by welding to a finger bar 7 which extends transversely across the front of the tractor and is provided with forwardly projecting fingers 8. This finger bar 7, and the fingers 8, may be substantially similar to those at present in use only the finger bar is longer. For instance, two old-type finger bars may be welded end-to-end.

Cutting knives 9 are provided along the front of a transverse knife-bar 10 which is disposed so that the knives, which may be of the usual type, will co-operate with the fingers 8 to perform the cutting operations when the knife-bar 10 is transversely reciprocated. The finger bar 7 and knife-bar 10 are held together in any known and suitable manner, such for instance as by the plates 11.

A longitudinal shaft 12 is slung beneath the tractor 4 and is driven at the rear by pulleys 13 and 14 and a flat belt 15 from the usual power-take-off shaft 16 at the rear of the tractor and above the shaft 12. The longitudinal shaft 12 is carried in a bearing 17 mounted on the strap 1a below the front axle 3 of the tractor 4 and in a bearing 18 mounted just in front of the pulley 14. The power take-off shaft 16 is extended rearwardly beyond the usual length to provide for a bearing 19 just in front of the pulley 14 which is located on the extension of such shaft. A downwardly depending bracket 20 is suitably secured to the tractor, and has at its bottom the bearing 18 in which the longitudinal shaft is carried. The flat belt 15 at the power take-off acts as a friction drive, permitting slipping if a jam occurs.

The means for driving the knife-bar are constructed as follows:

The knife-bar 10 is provided at its centre with an upwardly projecting pin 21 which is preferably welded in place and on which is located a roller 22. A rocking lever 23 pivots about a substantially upright pin 24 mounted to a web (not shown) joining the stays 6a and 6b together at the front, and has at its forward end a longitudinal slot 25 in which the said roller 22 works. The roller 22 is provided to ensure that friction and wear are minimised.

The rocking lever 23 is provided with two outwardly diverging and rearwardly projecting webs or arms 23a having at their outer ends a pair of integral hinge members 26 which are in line and located at the outer sides of hinge members 27 to be hereinafter described. A substantially horizontal hinge-pin 26a passes through the four hinge members 26 and 27 and also through a boss 26b which is integral with the rocking lever 23 and has a substantially vertical hole for the pin 24.

The axis of the hinge pin 26a substantially intersects the axis of the pin 24 which passes through a hole in the hinge pin 26a.

The other members 27 of the hinge are integral with, and disposed at the forward end end of a lever 28 which is provided at its front with integral webs 28a projecting sideways and connecting with the hinge members 27 which are in line but spaced apart, the boss 26b being located between said members 27.

The rear end of the lever 28 engages, and is carried round by, a recess in a boss 29 projecting eccentrically from the front face of a disc 30 on a shaft 31 which is carried by a bearing 33 mounted, just behind the disc 30, to a transverse frame member 32 welded between the stays 6a and 6b. The axis of the shaft 31 would, if extended intersect the axes of the pin 24 and the hinge-pin 26a.

The recess in the boss 29 houses a self-aligning ball-race engaged by the lever 28. A cover washer 28b is held in place on the face of the boss 29 by a spring 28c to exclude dirt from the bearing.

The shaft 31 has, just behind the transverse frame member 32 and axially in line with the hinges at the rear of the stays 6a and 6b, one member 34 of a universal joint mounted thereto, the other member 35 of the universal joint being mounted at the front of the longitudinal shaft 12.

It will be realized that the degree of inclination of the shaft 31 and the pin 24, and the various other members associated therewith, from the horizontal and vertical planes respectively will vary with the movement of the mowing or cutting unit about the hinges 5 by which it is articulated from the vehicle.

It will be realised that the method of reciprocating the knife-bar shown in Figures 1 to 5 permits the mowed material to pass over clear of the moving parts.

In Figures 1 and 5, I show a centre-shedder located mid-way along the finger bar so as to protect the knife actuating unit, and consisting of a blade or board 32' mounted on edge and slanting down towards a point at the front of the mower, such board 32' having a series of guide bars 33 attached near its point, such bars reaching upwardly and outwardly at an angle towards the rear. The board 32' is held in place by straps 32a, 32b suitably secured to the mower.

I provide, at the ends of the finger bar, and welded or bolted or otherwise secured to the side skids 34, which are mounted at the ends of the finger bar, flat plates 35 of spring steel each of which is so formed or set that the end of the knife-bar will strike it when such knife bar is at one end of its stroke, such strips thus acting as shock-absorbers and reducing friction.

To raise and lower the mowing or cutting unit, I employ a lever 36 on a shaft 37 pivotally mounted near the front of the tractor and extending rearwardly, such lever terminating in a handle 36a conveniently disposed adjacent to the driver's seat 38, and a toothed quadrant 36b and releasing grip 36c are provided so that the lever may be locked in any position, a forwardly projecting lever 39 being provided on the shaft 37 and having a chain or the like 40 connected thereto, such chain or the like 40 being connected to the hinged mowing or cutting unit by connection to the stays 32a so that appropriate actuation of the lever 36 will cause the mowing or cutting unit to be raised or lowered relatively to the ground.

Grease nipples 41 Figure 2, are provided in the various bearings and in the boss 29 of the rotatable member 30 to facilitate lubrication.

The operation of this form of the invention will be clear from the preceding description.

It will be realized that rotation of the disc 30 will carry round the rearward end of the lever 28 and will thus, through the hinge, cause the rocking lever 23 to rock and the knife-bar 10 to be reciprocated.

Preferably the proportions are such that the knife-bar travels about 6" from side to side, the knives passing preferably through two spaces between the fingers instead of only through one space as is usual.

In the construction shown in Figures 6 and 7, alternative means for transversely reciprocating the knife-bar 10a are shown comprising a vertically slotted upward projection 42 from such knife-bar, the slot 43 of such projection being engaged by a roller 44 on a pin 44a projecting from the front face of a rotatable disc 45 mounted at the forward end of a longitudinal shaft 46 which is mounted, near such forward end, in a bearing 47 attached to the hinged cutting or mowing unit 48, the rear end of the shaft 46 being driven through a universal joint 49 which is disposed at the forward end of the main longitudinal driving shaft 50. The mower may be constructed in other respects similarly to that shown in Figures 1 to 5.

In an alternative construction, the front of the tractor is provided with a pushing frame bolted to the tractor frame direct and comprising two downwardly depending and forwardly projecting members having secured to their forward ends a transverse frame member to which is hinged the mower frame.

A chain and sprockets may be employed instead of the pulleys and belt hereinbefore described.

It will be realised that the mowing or cutting unit may be mounted on wheels instead of the skids before described and shown in the accompanying drawings.

Vertically adjustable skids or runners may be employed at the ends of the finger bar to permit adjustment of the height of cut. For instance, in one form of the invention, the side skids may consist of a front toe connected to an upper member which carries the finger bar and a lower member which rests on the ground, a suitable vertical adjustment being provided between the upper and lower members. Preferably the lower member is hinged at its forward end to the front toe.

Side shedders may be provided as part of the side skids or runners, for the purpose of protecting the moving parts.

It will be realised that the employment of a mower constructed according to the present invention allows a comparatively great width of cut to be obtained. For instance, I have found that a cut of about 10 feet can be made with ease at about 10 M. P. H.

The operation of the last-mentioned form of the invention will be clear from the preceding description.

I claim:

1. In a mower of the reciprocating type which is operable by the motor of a motor vehicle across the front of which it is mountable and with respect to which it can move vertically, and which comprises a mower frame and a reciprocable knife-bar mounted on said frame, the following relationship of parts: means for reciprocating the knife-bar located substantially midway along the extent of the latter, a rocking member operatively engaging said means for reciprocating the knife-bar, a substantially upright axis upon which said rocking member is rockably mounted, a lever provided with a horizontal axis at the front end thereof, said rocking member being hinged at its rear end to said horizontal axis, a rotary member journalled on said mower frame, said rotary member being so positioned that its axis, if extended, would substantially intersect said horizontal and upright axes, the rear end of said lever being in eccentric engagement with said rotary member, whereby rotary movement of the latter is transmitted to said lever, and means extending longitudinally of the vehicle for driving said rotary member from the motor of said vehicle notwithstanding relative vertical movement thereof.

2. In a mower as defined in claim 1, the relationship of parts therein defined and supporting means on said motor vehicle, hinges whereby said mower frame is transversely hinged to said supporting means, said means for driving said rotary member comprising a universal joint in axial alignment with said mower frame hinges.

3. In a mower as defined in claim 1, the relationship of parts therein defined, and supporting means on said vehicle, said supporting means including brackets dependent from and attached directly to the motor vehicle frame, hinges whereby said mower frame is transversely hinged to said brackets, said means for driving said rotary member comprising a universal joint in axial alignment with said mower frame hinges.

4. In a mower as defined in claim 1, the relationship of parts therein defined, and said rocking member comprising a lever having a longitudinal slot, said knife-bar reciprocating means comprising a substantially upright pin, said pin being in operative engagement with said slot.

5. In a mower as defined in claim 1, the relationship of parts therein defined and the driving means for the knife-bar reciprocating means including a longitudinal shaft slung beneath the vehicle, means including pulleys and belting for driving said shaft from a power take-off at the rear of the vehicle, the front of said longitudinal shaft driving the knife-bar reciprocating means.

6. In a mower as defined in claim 1, relationship therein defined, and a center shedder for keeping the working parts substantially clear.

7. In a mower as defined in claim 1, the relationship of parts therein defined, and said mower frame being provided with forwardly extending spaced fingers cooperable with the knives of said knife-bar, the parts being so constructed and arranged that the knives each move through two spaces between said fingers.

8. In a mower of the reciprocating type which is operable by the motor of a motor vehicle across the front of which it is mountable and with respect to which it can move vertically, and which comprises a mower frame and a reciprocable knife-bar mounted on said frame, the following relationship of parts: means for reciprocating the knife-bar located substantially midway along the extent of the latter, a rocking member operatively engaging said means for reciprocating the knife-bar, a substantially upright axis upon which said rocking member is rockably mounted, a lever provided with a horizontal axis at the front end thereof, said rocking member being hinged at its rear end to said horizontal axis, said upright and horizontal axes intersecting each other substantially at right angles, a rotary member journalled on said mower frame, said rotary member being positioned so that its axis, if extended, would substantially intersect said horizontal and upright axes, said rotary member being provided with an eccentrically-positioned recess, the rear end of said lever being in engagement with said recess, whereby rotary movement of the rotary member is transmitted to said lever, and means extending longitudinally of the vehicle for driving said rotary member from the motor of said vehicle notwithstanding relative vertical movement of the rotary member, said last named means comprising a universal joint intermediate said rotary member and said motor vehicle.

9. In a mower of the reciprocating type which is operable by the motor of a motor vehicle across the front of which it is mountable and with respect to which it can move vertically, and which comprises a mower frame, and a reciprocable knife-bar mounted on said frame, the following relationship of parts: means for reciprocating the knife-bar located substantially midway along the extent of the latter, a rocking member operatively engaging said means for reciprocating the knife-bar, a substantially upright axis upon which said rocking member is rockably mounted, a lever provided with a horizontal axis at the front end thereof, said rocking member being hinged at its rear end to said horizontal axis, said upright and horizontal axes intersecting each other substantially at right angles, a rotary member journalled on said mower frame, said rotary member being positioned so that its axis, if extended, would substantially intersect said horizontal and upright axes, said rotary member being provided with an eccentrically-positioned recess, said recess housing a self-aligning antifriction bearing, the rear end of said lever being in engagement with said antifriction bearing whereby a rotary movement of said rotary member is transmitted to said lever, and means extending longitudinally of the vehicle for driving said rotary member comprising a universal joint in axial alignment with said mower frame hinges.

JAMES MUNRO.